United States Patent [19]

Klingberg, deceased et al.

[11] 4,069,539

[45] Jan. 24, 1978

[54] WIPER DEVICE FOR WINDSHIELDS AND HEADLIGHT GLASSES

[76] Inventors: Olle Herbert Klingberg, deceased, late of Lindesberg, Sweden; by Sven Valfridsson, administrator, Syrenvagen 2, S-772 00 Grangesberg, Sweden

[21] Appl. No.: 687,129

[22] Filed: May 17, 1976

[30] Foreign Application Priority Data

May 23, 1975 Sweden .................................. 7505924

[51] Int. Cl.² ............................................... B60S 1/40
[52] U.S. Cl. .................................. 15/250.32; 403/353
[58] Field of Search ........................ 15/250.32–250.42; 403/353, 388, 393

[56] References Cited

U.S. PATENT DOCUMENTS

| 1,804,420 | 5/1931 | Kelley | 403/353 X |
| 1,946,073 | 2/1934 | Horton et al. | 15/250.32 |
| 2,324,365 | 7/1943 | Coutts | 15/250.32 X |
| 2,556,839 | 6/1951 | Cretella | 403/353 |
| 3,576,044 | 4/1971 | Besnard | 15/250.32 |

FOREIGN PATENT DOCUMENTS 455,299  10/1936  United Kingdom ............. 15/250.32

Primary Examiner—Peter Feldman
Attorney, Agent, or Firm—Pollock, Vande Sande & Priddy

[57] ABSTRACT

A wiper device for automotive windshields, headlight glass and the like, comprising a wiper arm and blade combination. The wiper blade has two cylindrical projections receivable in a keyhole opening in the wiper arm. Each of the projections has a flange adapted to cooperate with an arcuate end portion of the opening, permitting the arm to swing between extreme positions and to yield when obstacles are encountered.

8 Claims, 7 Drawing Figures

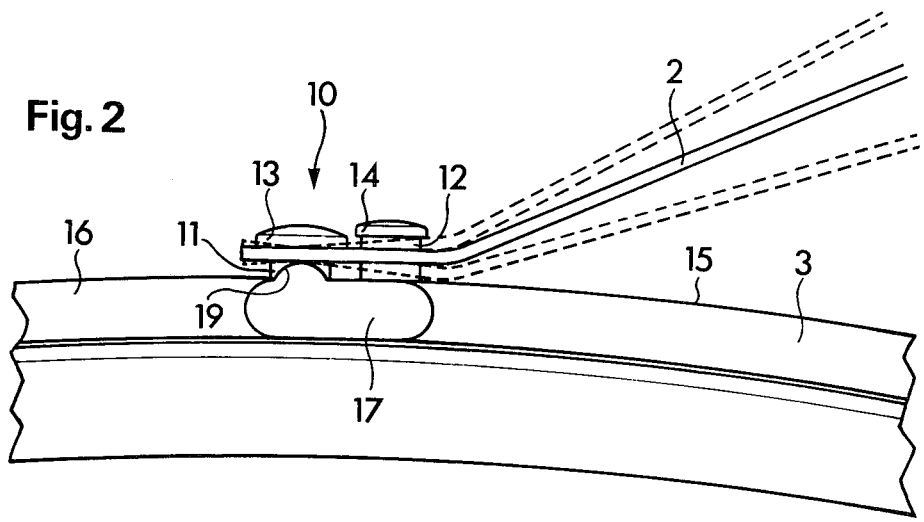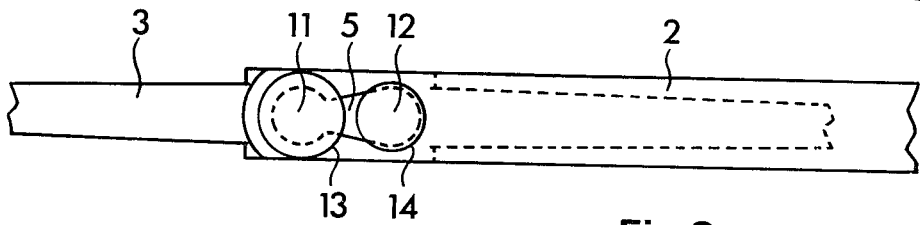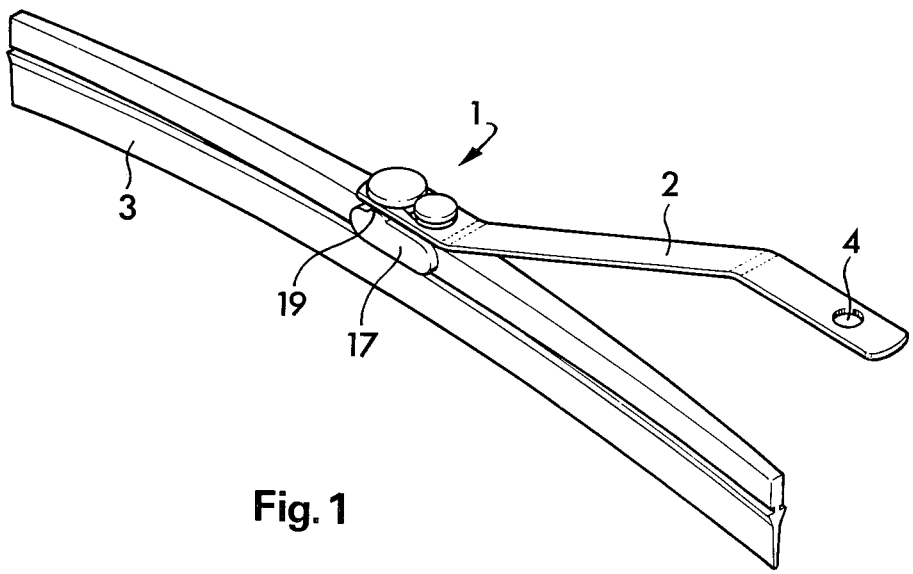

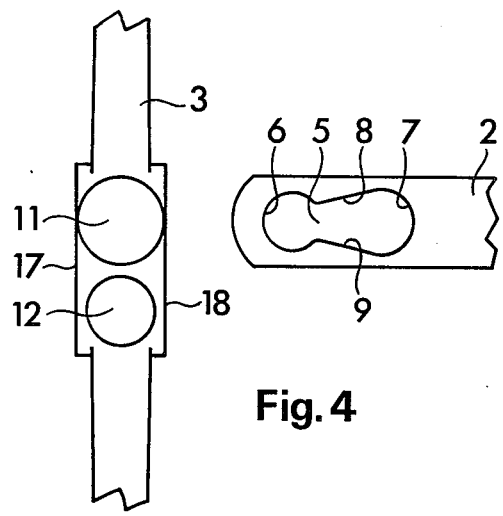
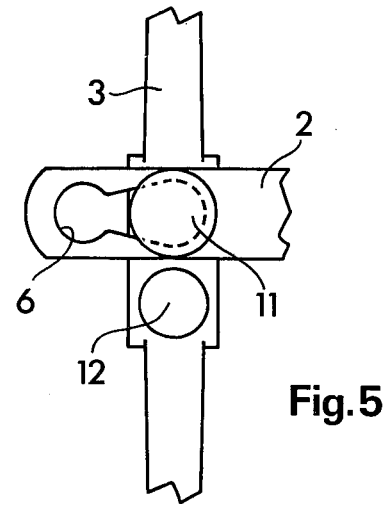
Fig. 4  Fig. 5
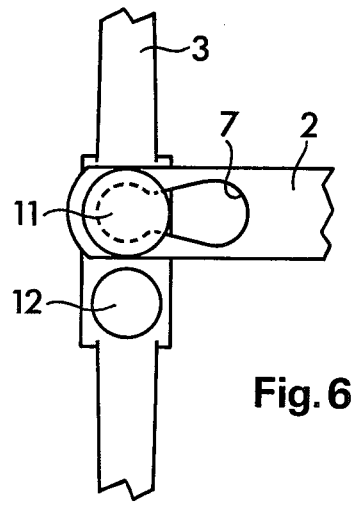
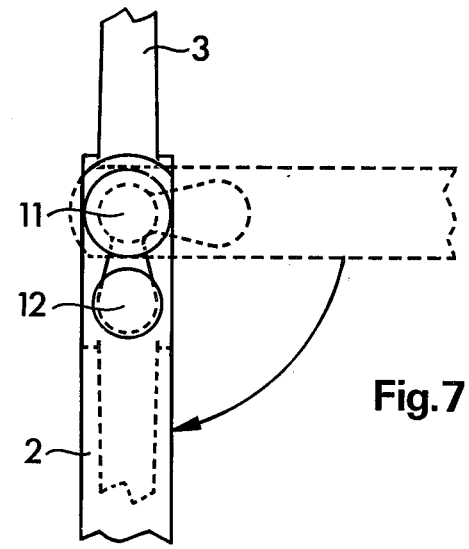
Fig. 6  Fig. 7

WIPER DEVICE FOR WINDSHIELDS AND HEADLIGHT GLASSES

The present invention concerns a wiper device for windshields and headlight glass, especially for motor vehicles, which device includes a wiper arm and a wiper blade of flexible material.

The safety standards for motor vehicles and accessories are continuously rising. One of these standards relates to concealment of the wiper devices for windshields and headlight glass when not in use. In the case of windshield wipers this can be achieved by locating the wiper arms with wiper blades inoperative in a recess or depression in the car body below the windshield. In the case of wipers for headlight glasses the aim is to locate these in a plane behind the front of the vehicle in order to make the front as smooth as possible, so as to avoid bodily injury in case of collision with a pedestrian. The problem here is to give the wiper device, i.e., the wiper arm and the blade, as low a profile as possible, or, in other words, to locate the attachment point of the arm to the blade as close to the latter as possible under maintenance of full mobility of the blade, especially laterally.

The object of the present invention is to provide a wiper device of the kind indicated above, which solves the said problem in an advantageous manner.

The present invention will now be described with under reference to the annexed drawings, wherein FIG. 1 is a perspective view of a wiper device of the invention, FIG. 2 shows a side elevation of a portion thereof FIG. 3 shows a plan view of the same portion and FIGS. 4–7 show different stages of the assembly of the device.

The wiper device 1 according to the invention includes an arm 2, preferably of metal, which is substantially rigid in its direction of swinging, but somewhat resilient in the direction towards the surface to be wiped, and a blade 3 of flexible material, such as plastic or rubber.

The wiper arm 2 is suitably bent and is provided with a fastening hole 4 for attachment to a driving means. In the end opposite to the fastening hole 4, the wiper arm is provided with an opening 5 with a keyhole-like shape, which is adapted to cooperate with fastening or retaining means of the wiper blade 3.

In the embodiment shown, the opening 5 consists of an arcuate portion 6 extending over more than 180°, and another arcuate portion 7 extending over approximately 180°. From portion 7, the opening 5 tapers with preferably straight sides 8 and 9 towards portion 6.

Wiper arm 3, which may be manufactured of extruded plastic material or preferably of molded and halogenated rubber, is provided, at or near its center, with a retaining means 10 integral with the blade. This means includes two projections 11 and 12 disposed one after the other in the longitudinal direction of the blade and projecting perpendicularly from the blade, and having sections as right, circular cylinders. The front projection 11, as seen in the direction of arm 2, is formed with an annular collar or flange 13, and the rear projection 12 is formed with a likewise annular collar or flange 14, flange 14 of projection 12 having a smaller diameter than flange 13 of projection 11, and, further, the underside of flange 14 being located a somewhat greater distance from the back surface 15 of wiper blade 3 than is underside of flange 13.

Below projections 11 and 12 and integral with the blade, the back or spine portion 16 thereof is formed on both sides with bosses 17 and 18 extending in the longitudinal direction of the blade substantially in correspondence with the over-all length occupied by projections 11 and 12 including flanges 13 and 14. The thickness of the bosses is such that the width of the spine portion of the blade plus the thickness of the bosses substantially correspond to the width of arm 2.

Straight opposite the front projection 11, bosses 17 and 18 are formed with respective rounded portions 19 and 20 facing flange 13 (only portion 19 is shown on the drawings).

The assembly of the two parts of the wiper device, the arm 2 and the blade 3, is shown in FIGS. 4–7 and is performed in the following way. Arm 2 is laterally (FIG. 4) moved at substantially right angles towards blade 3 so that portion 7 and the portion of opening 5 tapering towards portion 6 can be forced onto projection 11 under elastic deformation of flange 13 (FIG. 5). Arm 2 is thereafter pulled backwards, whereby projection 11 is moved into portion 6 of opening 5 (FIG. 6). By swinging (clockwise according to FIG. 7) arm 2 is brought to a position parallel with blade 3, whereafter portion 7 of opening 5 is forced onto projection 12 under elastic deformation of flange 14. In this position, the arm is secured to the blade, on the one hand by the blocking action of flanges 13 and 14 and on the other hand by the cylindrical projections 11 and 12, which now completely fill up the part-circular portions 6 and 7 of the opening 5 and thus prevent longitudinal displacement of the blade relative to the arm.

In the assembled state of the wiper device (FIG. 2), the rounded portions 19 and 20 of bosses 17 and 18 serve to keep the end of arm 2 in contact with the underside of flange 13. Normally arm 2 has the position shown in full lines in FIG. 2. It is possible, however, for the arm to swing, its front end rolling against the rounded portions 19 and 20 and under elastic yielding of flange 13, between the extreme positions indicated in dashed lines, which are defined by contact of the arm against flange 14 on the one hand back surface 15 of blade 3 on the other.

During operation of the device, the rounded portions 19 and 20, and possibly other portions of the bosses 17 and 18, are supported by the arm 2, thereby to prevent excessive tilt of the wiper blade relative to the wiped surface.

Due to the flexibility and elasticity of the projections 11 and 12, blade 3 can yield for possible obstacles, e.g., in the form of snow or ice, on the wiped surface, without appreciably jeopardizing the retention of the blade on arm 2. This has not been possible with conventional wiper devices.

I claim:

1. A wiper device for automotive windshields and the like, including a wiper arm and a wiper blade of flexible material, said wiper arm having an oblong opening therein, fastening means on said wiper blade adapted to be received within said opening of the arm, said fastening means comprising two cylindrical projections protruding from the blade and adapted to abut with at least portions of their outer surfaces against first and second arcuate end portions of the opening of the arm when the arm and the blade are assembled, each of said projections having means at its outer end adapted to cooperate with an arcuate end portion of the opening, permitting said wiper arm to swing between extreme positions and to yield when obstacles are encountered.

2. A device according to claim 1, wherein said first arcuate end portion extends over more than 180°.

3. A device according to claim 2, wherein said second end portion of said opening extends over substantially 180°, said opening tapering with straight sides towards said first end portion.

4. A device according to claim 1, wherein said projections at their outer ends have annular flanges.

5. A device according to claim 4, wherein the flange of the projection adapted to cooperate with said first arcuate end portion of said opening has a larger diameter than the other flange.

6. A device according to claim 5, wherein the underside of said other flange is located a greater distance from said wiper blade than is the underside of said first flange.

7. A device according to claim 6, wherein the back portion of said wiper blade in the area of the projections is formed with bosses integral with the material of the blade.

8. A device according to claim 7, wherein said bosses opposite the projection having the larger flange are provided with rounded portions facing this flange and projecting from said bosses.

* * * * *